(12) United States Patent
Hattori et al.

(10) Patent No.: US 6,206,128 B1
(45) Date of Patent: Mar. 27, 2001

(54) WORKING VEHICLE

(75) Inventors: Akio Hattori; Hidetaka Yoshioka, both of Osaka; Satoshi Machida, Sakai, all of (JP)

(73) Assignee: Kubota Corporation (JP)

( * ) Notice: Subject to any disclaimer, the term of this patent is extended or adjusted under 35 U.S.C. 154(b) by 0 days.

(21) Appl. No.: 09/339,354

(22) Filed: Jun. 24, 1999

(30) Foreign Application Priority Data

Oct. 19, 1998 (JP) .................................................. 10-296886

(51) Int. Cl.[7] .................................................. B60K 17/34
(52) U.S. Cl. ........................ 180/244; 180/247; 180/250; 74/665 T; 192/48.5; 192/87.17; 192/87.19
(58) Field of Search ........................ 74/665 T; 192/48.5, 192/48.91, 87.17, 87.19; 180/233, 244, 247, 248, 249, 250

(56) References Cited

U.S. PATENT DOCUMENTS

| 4,648,493 | * | 3/1987 | Schilling et al. | ................. 192/87.19 |
| 4,723,622 | * | 2/1988 | Toshikuni et al. | .................... 180/248 |
| 4,862,988 | * | 9/1989 | Umemoto | .............................. 180/246 |
| 5,038,885 | * | 8/1991 | Sato et al. | ............................. 180/247 |
| 5,383,531 | * | 1/1995 | Yoshioka et al. | ..................... 180/233 |

FOREIGN PATENT DOCUMENTS

| 2032022 | * | 4/1980 | (GB) | ................................ 192/87.17 |
| 35858 | * | 4/1978 | (JP) | .................................. 192/87.19 |
| 5162654 | | 6/1993 | (JP) . | |
| 9072309 | | 3/1997 | (JP) . | |

* cited by examiner

*Primary Examiner*—Brian L. Johnson
*Assistant Examiner*—Avraham H. Lerner
(74) *Attorney, Agent, or Firm*—Webb Ziesenheim Lodgson Orkin & Hanson, P.C.

(57) ABSTRACT

In a working vehicle such as an agricultural tractor, a front wheel change speed device for transmitting drive to front wheels includes an equal speed clutch for driving the front wheels substantially at the same speed as rear wheels, and an accelerating clutch for driving the front wheels substantially at a higher speed than the rear wheels. In the front wheel change speed device of this invention, the equal speed clutch and accelerating clutch are arranged coaxially. The front wheel change speed device further includes a shift member axially shiftable for selectively operating the equal speed clutch and accelerating clutch, and an actuator for axially shifting the shift member.

11 Claims, 8 Drawing Sheets

WORKING VEHICLE

BACKGROUND OF THE INVENTION

1. Field of the Invention

This invention relates to working vehicles, and more particularly to an improvement in a working vehicle having a front wheel change speed device for transmitting drive from an engine to front wheels in an equal speed mode for driving the front wheels and rear wheels at a substantially equal peripheral speed, and in an accelerating mode for driving the front wheels at a substantially faster peripheral speed than the rear wheels.

2. Description of the Related Art

A working vehicle having the above construction is disclosed in Japanese Patent Laying-Open Publication H5-162654, for example. This conventional vehicle has an equal speed clutch for transmitting substantially the same drive speed to front wheels as a peripheral speed of rear wheels, and an accelerating clutch for transmitting a faster drive speed to the front wheels than the peripheral speed of the rear wheels. When a steering angle of the front wheels is less than a predetermined value, the equal speed clutch remains engaged under the biasing force of a spring. When the steering angle of the front wheels reaches the predetermined value, a hydraulic selector valve is operated in response to the steering operation to engage the accelerating clutch by means of hydraulic drive to transmit high-speed drive to the front wheels.

This type of working vehicle is constructed to reduce a turning radius by increasing drive speed of the front wheels automatically when the front wheels are steered by a large degree as when the vehicle makes a turn near a ridge during a farming operation. However, where, as in the conventional working vehicle, the equal speed clutch is maintained engaged by the biasing force of a spring, the spring used is relatively strong to secure the engaged state reliably. In order to accelerate the front wheels, an operation to engage the accelerating clutch must be executed against the biasing force of the spring. This operation requires strong drive, which has been a cause of an enlarged hydraulic system.

SUMMARY OF THE INVENTION

The object of this invention is to provide a working vehicle having an improved construction for operating clutches to switch front wheel driving modes.

The above object is fulfilled, according to this invention, by a working vehicle comprising a front wheel change speed device having an equal speed clutch for transmitting drive to the front wheels in an equal speed drive state, an accelerating clutch disposed on a common axis with the equal speed clutch for transmitting drive to the front wheels in an accelerating state, a shift member shiftable along the axis to three positions for selectively operating the equal speed clutch and the accelerating clutch, and an actuator for shifting the shift member along the axis to the three positions.

With this construction, the actuator drives the shift member for selectively engaging the equal speed clutch and accelerating clutch. Thus, the front wheel change speed device has a simple construction for operating the two clutches.

In a preferred embodiment of this invention, the accelerating clutch is in the form of a friction type clutch. Thus, when drive is transmitted in acceleration to the front wheels, a sudden speed increase is checked to suppress shock.

Further, the equal speed clutch is in the form of a claw type clutch operable to maintain a reliable, strong tractive force without slippage.

Other features and advantages of this invention will be apparent from the following description of an embodiment to be taken with reference to the drawings.

DETAILED DESCRIPTION OF THE PREFERRED EMBODIMENT

An embodiment of this invention will described hereinafter with reference to the drawings.

Figure 1:
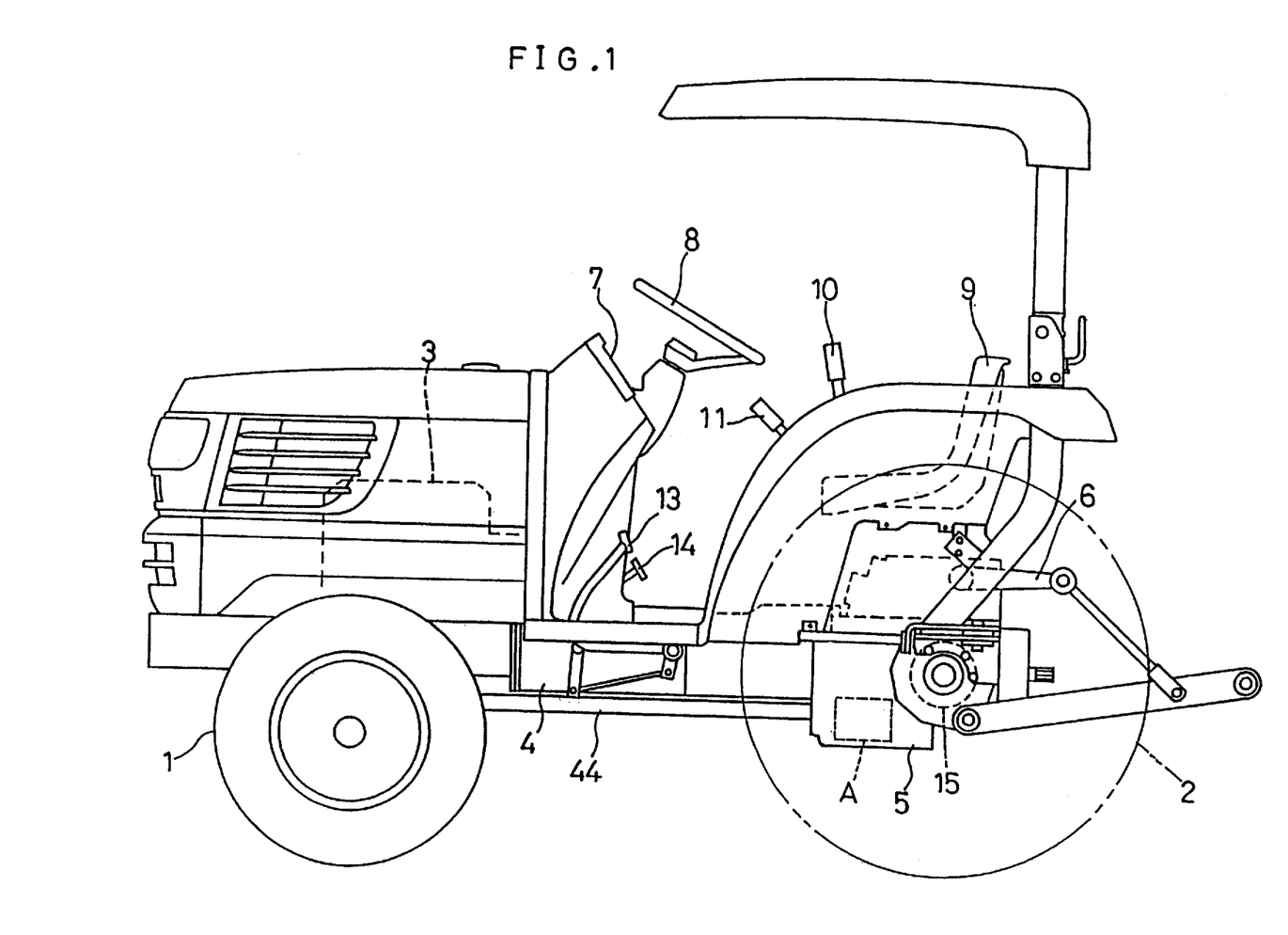
FIG. 1 is a side elevation of an agricultural tractor.

FIG. 1 shows an agricultural tractor which is one example of working vehicles. In the following description, the terms fore and aft direction and right and left direction are defined as the forward, rearward, rightward and leftward directions with reference to the agricultural tractor.

The agricultural tractor includes a vehicle body with front wheels 1 and rear wheels 2 and having an engine 3 mounted in a front position thereof. Power of the engine 3 is transmitted through a main clutch 4 to a transmission case 5 disposed in a rearward position of the vehicle body. A pair of right and left lift arms 6 are connected to upper rear positions of the transmission case 5 to be vertically pivotable by a lift cylinder (not shown). The vehicle body includes a meter panel 7, a steering wheel 8 and a driver's seat 9 arranged in a central region thereof. Further, a position lever 10 is disposed at the right side of the driver's seat 9 for controlling the lift arms 6. A main shift lever 11 is disposed at the left side of the driver's seat 9 for controlling a change speed device mounted in the transmission case 5.

The change speed device has a hydraulic actuator (not shown) for controlling a synchromesh type change speed gearing. A hydraulic clutch is mounted in an intermediate position of a transmission shaft. In time of a shifting operation, the hydraulic clutch is disengaged, with pressure oil drained therefrom, by operation of the hydraulic actuator. After the shifting operation, pressure oil is supplied to the hydraulic clutch to engage the clutch. The main shift lever 11 is interlocked to a rotary valve (not shown) which controls the hydraulic actuator.

Figure 2:
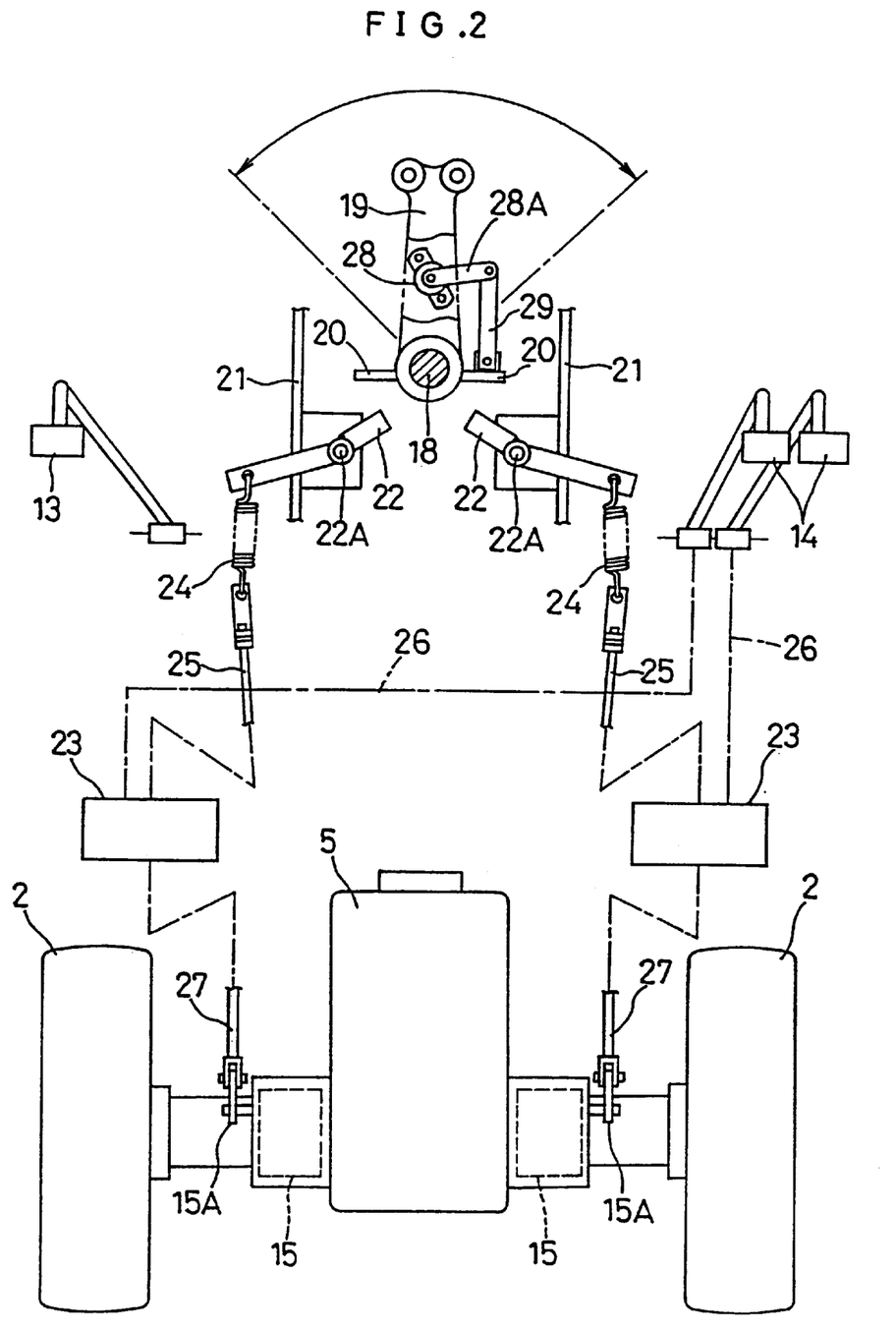
FIG. 2 is a schematic plan view of a brake operating system.

As shown in FIGS. 1 and 2, a main clutch pedal 13 is disposed in a leftward region of a driver's platform, which is depressable to disengage the main clutch 4. A pair of right and left side brake pedals 14 are disposed in a rightward region of the driver's platform.

The side brake pedals 14 are connected to side brakes 15, respectively. The side brakes 15 apply braking forces, independently of each other, to right and left transmission shafts (not shown) which transmit drive from the transmission case 5 to the right and left rear wheels 2. Operation of the steering wheel 8 is transmitted to a power steering mechanism (not shown) which drives a vertical rotary shaft 18. A pitman arm 19 is provided to be pivotable with rotation of the rotary shaft 18. The pitman arm 19 is interlocked to the right and left front wheels 1 (the interlocking structure not particularly described) to steer the front wheels 1.

The pitman arm 19 has contact members 20 attached to right and left positions at a proximal end thereof to be pivotable with the pitman arm 19. A body frame 21 supports pivotal members 22 to be pivotable about pivotal axes 22A extending vertically. When the pitman arm 19 swings in excess of a predetermined amount, the contact members 20 contact the pivotal members 22 to swing the pivotal members 22. The right and left pivotal members 22 are connected to right and left switch mechanisms 23 through springs 24 and rods 25, respectively. The right and left selector or switch mechanisms 23 receive operating forces of the right and left side brake pedals 14 through rods 26, respectively. The right and left change mechanisms 23 are connected to the right and left side brakes 15 through control arms 15A and rods 27, respectively. Each switch mechanism 23 has a function to select the operating force from the side brake pedal 14 or the operating force from the pivotal member 22, and transmits the selected operating force to the side brake 15 (a specific structure not particularly described). Thus, the switch mechanisms 23 are selectively operable in a mode for operating the right and left side brakes 15 in response to depression of the side brake pedals 14, and in a mode for operating one of the side brakes 15 lying inwardly of a vehicle turn in response to an operation of the steering wheel 8.

The body frame 21 supports a potentiometer type steering sensor 28 having a control arm 28A connected to a proximal position of the pitman arm 19 through a link 29. This construction is provided to measure a steering angle of the front wheels 1.

As shown in FIG. 1, a front wheel change speed device A is disposed in a lower position of transmission case 5 for transmitting drive from the transmission case 5 to the front wheels 1. The front wheel change speed device A is operable, when the tractor makes a turn with a small radius, to provide an equal speed mode for driving the front wheels 1 and rear wheels 2 at a substantially equal peripheral speed, an accelerating mode for driving the front wheels 1 at a substantially faster peripheral speed than the rear wheels 2, and a two wheel drive mode for breaking power transmission to the front wheels 1. In the equal speed mode, the front wheels 1 are driven at substantially the same peripheral speed as the rear wheels 2. The term "substantially" includes a case where a difference between the peripheral speed of front wheels 1 and the peripheral speed of rear wheels 2 does not exceed 10% of the peripheral speed of rear wheels 2. The difference should desirably be 5% or less. It is more preferable that the front wheels 1 are driven at a peripheral speed 2 to 3% faster than the rear wheels 2. In the accelerating mode, the front wheels 1 are driven at a "substantially" faster peripheral speed than the rear wheels 2, which means that the front wheels 1 are driven at a peripheral speed at least 30% faster than the rear wheels 2. Preferably, the front wheels 1 are driven, in this state, at a peripheral speed at least 50% faster than the rear wheels 2. Still more preferably, the front wheels 1 are driven at a peripheral speed 60 to 80% faster than the rear wheels 2.

Figure 3:
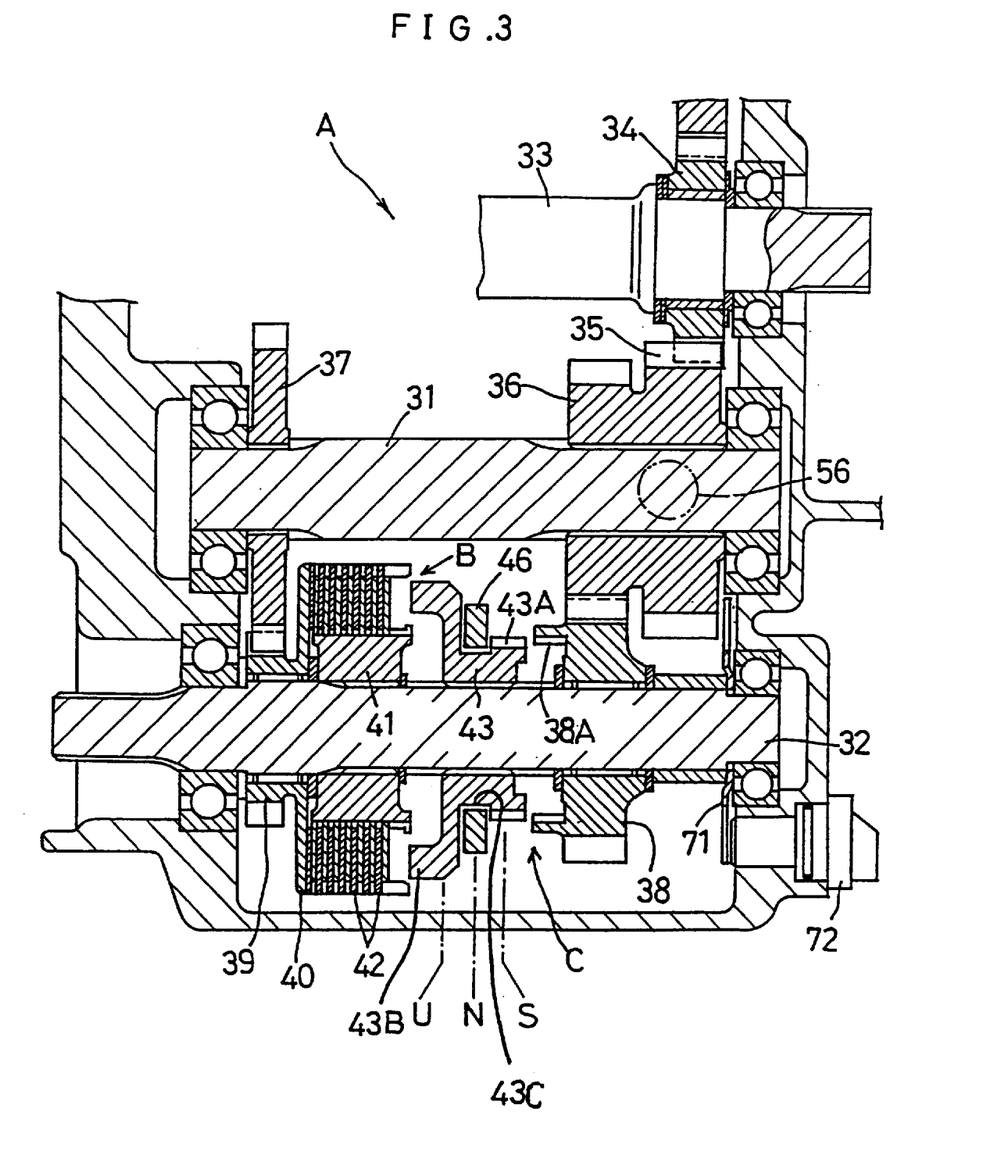
FIG. 3 is a development showing connections of components of a front wheel change speed device according to this invention.
Figure 4:
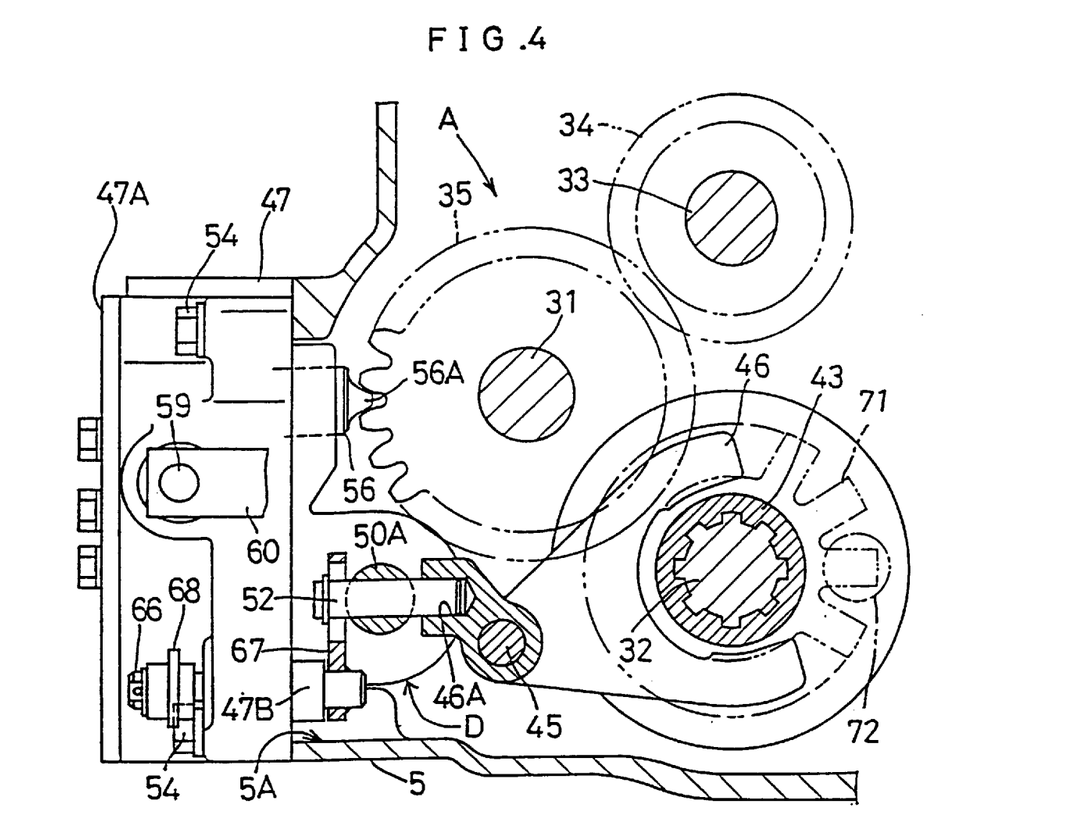
FIG. 4 is a sectional view of the front wheel change speed device.

As shown in FIGS. 3 and 4, an intermediate shaft 31 extends in the fore and aft direction through a lower space inside the transmission case 5. A front wheel drive shaft 32 is rotatably supported parallel to the intermediate shaft 31. The intermediate shaft 31 has a first gear 35 mounted thereon. The first gear 35 is meshed with a gear 34 which receives drive for driving the rear wheels 2. This gear 34 is relatively rotatably mounted on a power takeoff shaft 33 to receive the drive through a different gear not shown. The intermediate shaft 31 has, mounted to be rotatable therewith, a second gear 36 disposed adjacent the first gear 35, and a third gear 37 having a larger number of teeth than the second gear 36. The front wheel drive shaft 32 has, mounted to be rotatable relative thereto, a fourth gear 38 meshed with the second gear 36, and a fifth gear 39 meshed with the third gear 37 and having a smaller number of teeth than the fourth gear 38. The front wheel drive shaft 32 supports also an accelerating clutch B including a clutch case 40 rotatable with the fifth gear 39, a support member 41 disposed radially inwardly of the clutch case 40 and splined to the front wheel drive shaft 32, and a plurality of friction disks 42 arranged between the clutch case 40 and support member 41. Further, the front wheel drive shaft 32 supports an equal speed clutch C including clutch claws 38A formed on a side surface of the fourth gear 38.

A transmission line is formed to transmit drive from a forward end of front wheel drive shaft 32 to the front wheels 1 through a transmission shaft (not shown) mounted in a tubular case 44 shown in FIG. 1.

A shift member 43 is axially slidably splined to the front wheel drive shaft 32 between the accelerating clutch B and equal speed clutch C. As shown in detail in FIG. 3, the shift member 43 has clutch claws 43A for engaging the clutch claws 38A of the fourth gear 38, and a tubular end 43B axially remote from the clutch claws 43A for contacting the friction disks 42. A recess 43C is formed between the clutch claws 43A and end 43B for receiving a shifter 46 described later.

The shift member 43 is slidable to a position (hereinafter called equal speed position S) to engage the clutch claws 43A with the clutch claws 38A of the fourth gear 38, thereby to establish an equal speed drive state for driving the front wheels 1 at substantially the same peripheral speed as the rear wheels 2.

The shift member 43 is slidable also to a position (hereinafter called accelerating position U) to press the friction disks 42, thereby to establish an accelerating state for driving the front wheels 1 at a substantially faster peripheral speed than the rear wheels 2.

Further, the shift member 43 is slidable to a position (hereinafter called neutral position N) between the equal speed position S and accelerating position U to establish a state for breaking power transmission to both the equal speed clutch C and accelerating clutch B.

As shown in FIG. 4, a guide shaft 45 is disposed in a bulge portion of transmission case 5 to extend parallel to the front wheel drive shaft 32. The shifter 46 engaging the recess 43C of shift member 43 is provided to be movable as guided by the guide shaft 45. As shown in FIG. 4, the shifter 46 has a C-shaped end.

Figure 7:
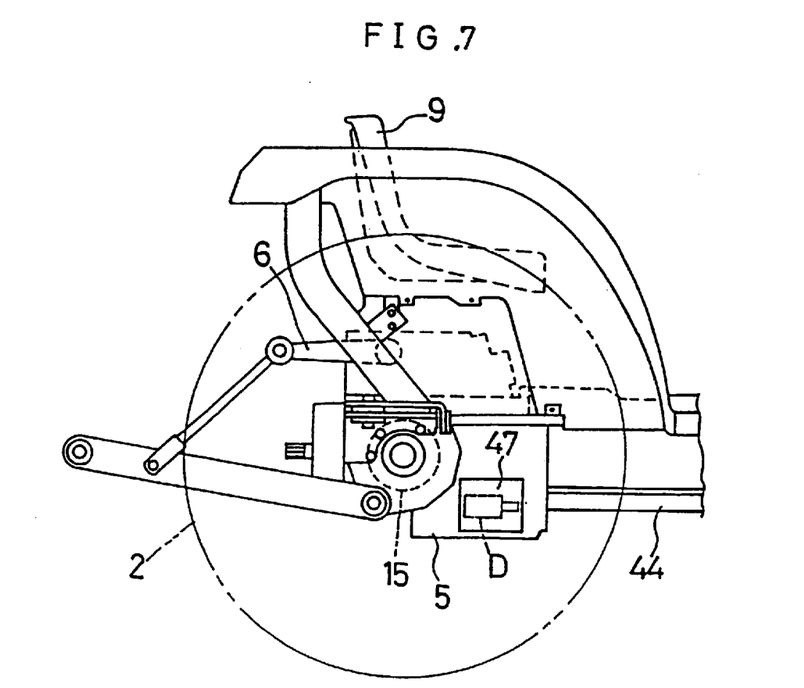
FIG. 7 is a side view of a rear portion of the working vehicle showing a position of an actuator.

The transmission case 5 has an opening 5A formed in a side wall of the bulge portion, and a lid-like member 47 for closing the opening 5A. In the region of opening 5A, a hydraulic cylinder D is disposed to acting as an actuator for driving the shifter 46. In this embodiment, the hydraulic cylinder D is attached to the lid-like member 47 detachably attached to the transmission case 5. Thus, as shown in FIG. 7, the hydraulic cylinder D is disposed in a region of the right surface of transmission case 5, and adjacent the front wheel drive shaft 32 connecting the front wheel change speed device A to the front wheels 1. The hydraulic cylinder D may of course be disposed in a region of the left surface of transmission case 5.

Figure 6:
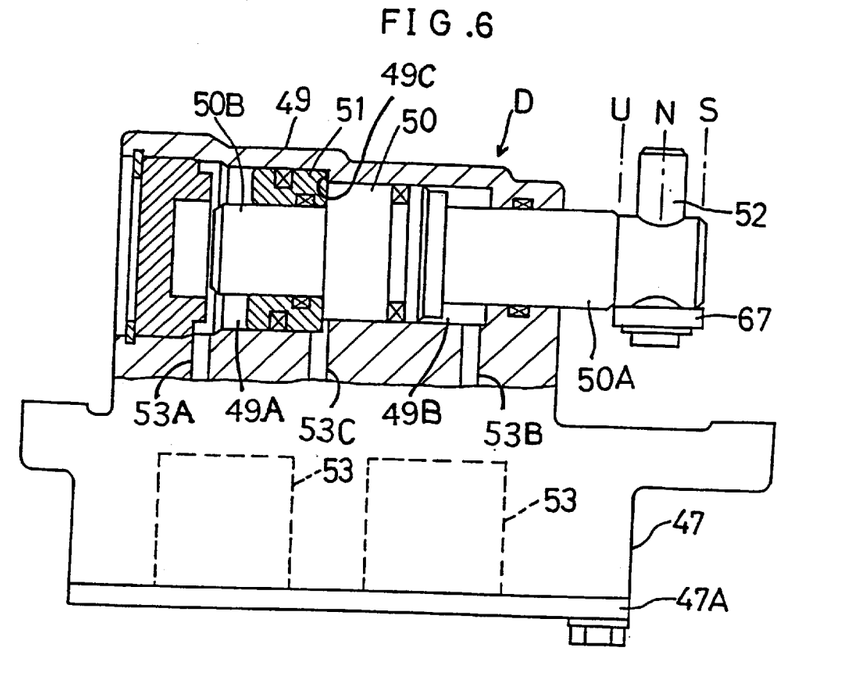
FIG. 6 is a sectional view of a hydraulic cylinder.

As shown in FIG. 6, the hydraulic cylinder D includes a cylinder tube 49, and a piston 50 slidably mounted therein to act as an actuating member. The hydraulic cylinder D has an oil line 53A communicating with a large-diameter oil chamber 49A accommodating a neutral piston 51, an oil line 53B communicating with a small-diameter oil chamber 49B, and an oil line 53C communicating with an intermediate stepped portion 49C of the cylinder tube 49. The piston 50 has a pair of piston rods 50A and 50B formed thereon, with only one of the piston rods 50A projecting from the cylinder tube 49. The neutral piston 51, which is ring-shaped, is slidably mounted on the other piston rod 50B. The piston rod 50A has an engaging pin 52 projecting from one end thereof for engaging an engaging bore 46A of the shifter 46. Thus, drive is transmitted from the hydraulic cylinder D to the shift member 43 through the shifter 46.

Figure 9:
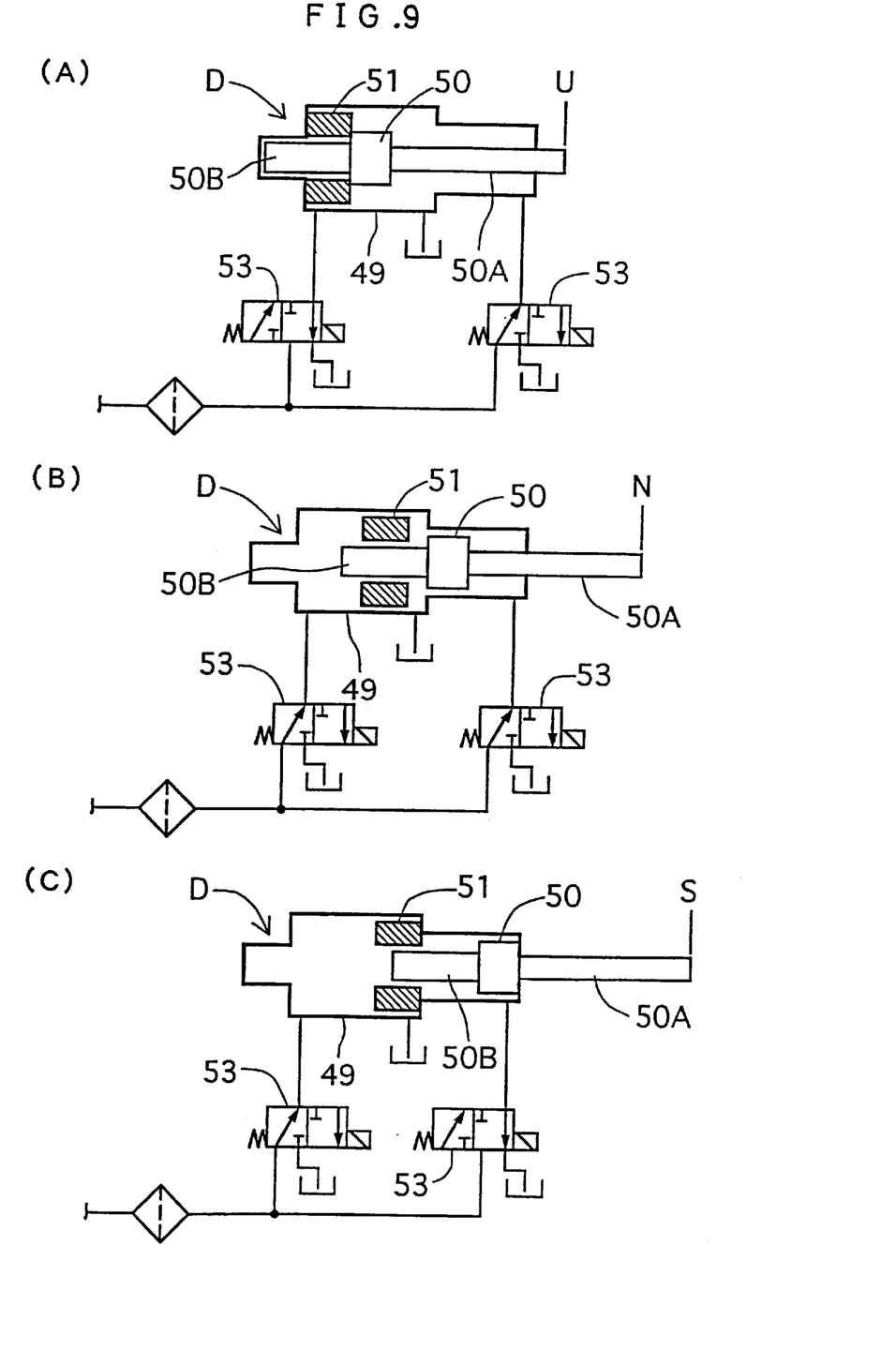
FIG. 9 shows hydraulic circuit diagrams of the hydraulic cylinder operated to three positions.

FIG. 9 shows a hydraulic system for operating the hydraulic cylinder D. Pressure oil is supplied to and drained from the oil lines 53A and 53B at opposite ends through electromagnetic valves (EMV) 53, respectively. Oil is only drained from the intermediate oil line 53C to a tank. With this hydraulic cylinder D, when pressure oil is supplied only to the small-diameter oil chamber 49B, the piston rod 50A is retracted as shown in FIG. 9 (A), to operate the shift member 43 to the accelerating position U. When pressure oil is supplied to the small-diameter oil chamber 49B and large-diameter oil chamber 49A at the same time as shown in FIG. 9 (B), the neutral piston 51 is operated to a position for contacting the stepped portion 49C of the cylinder tube 49. By operating the piston 50 to a position for contacting the neutral piston 51, the shift member 43 may be shifted to the neutral position N. When pressure oil is supplied only to the large-diameter oil chamber 49A, as shown in FIG. 9 (C), to move the neutral piston 51 to the position for contacting the stepped portion 49C, and thereafter apply a pressure to an end of piston rod 50B to project the piston rod 50A, the shift member 43 is shifted to the equal speed position S.

The end of piston rod 50B has a smaller area for receiving the pressure of pressure oil than a portion of piston 50 for receiving the pressure of pressure oil supplied to the small-diameter oil chamber 49B. The neutral piston 51 has a larger area for receiving the pressure of pressure oil supplied to the large-diameter oil chamber 49A than the above portion of piston 50. Consequently, when pressure oil is supplied to both of the oil chambers 49A and 49B as noted above, the neutral piston 51 and piston 50 are placed in pressure contact with each other to establish the neutral position N. Further, even when pressure oil is supplied under equal pressure to the oil chambers 49A and 49B, the shift member 43 is moved faster from neutral position N to equal speed position S than from neutral position N to accelerating position U.

As shown in FIG. 4, the lid-like member 47 is connected to the transmission case 5 by tightening bolts 54 to close the opening 5A. The engaging pin 52 is set to extend along the direction in which the lid-like member 47 is attached to and detached from the transmission case 5. Thus, the engaging pin 52 is movable into and out of engagement with the engaging bore 46A as the lid-like member 47 is attached to or detached from the transmission case 5.

Figure 5:
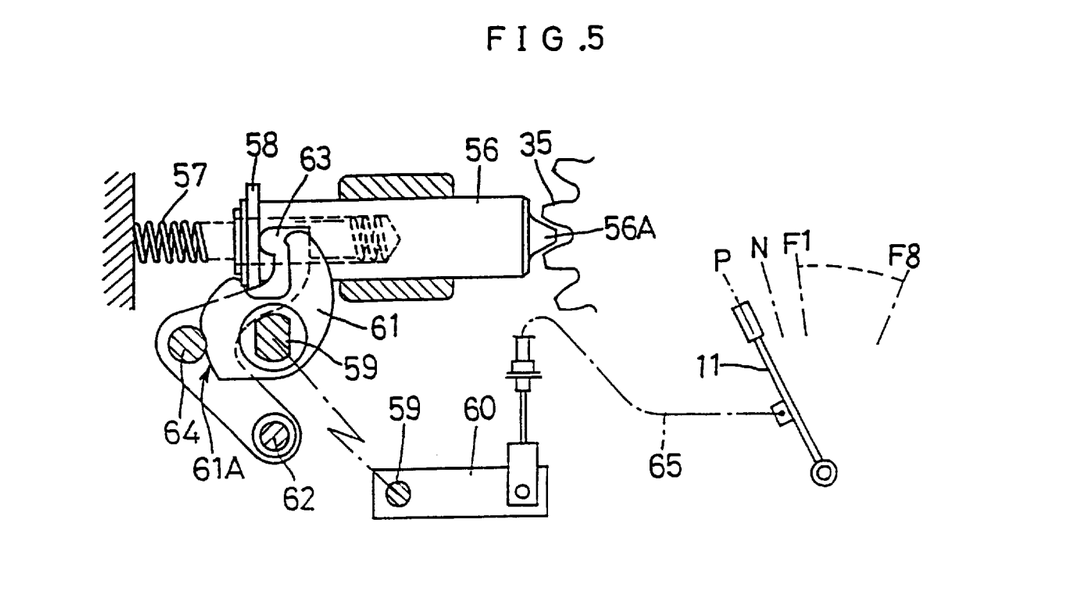
FIG. 5 is a schematic view showing a restrictor control system.

The lid-like member 47 has a plate 47A bolted thereto for covering an outer surface. The two electromagnetic valves 53 for controlling the hydraulic oil supplied to and drained from the hydraulic cylinder D are arranged on an inner surface of the plate 47A as shown in FIG. 6. A restrictor 56 is provided to be slidable in diametric directions of the first gear 35 into and out of engagement with the teeth thereof. As shown in FIGS. 4 and 5, the restrictor 56 acts as a parking brake for engaging the first gear 35 to prevent rotation of the transmission system for driving the wheels 1 and 2. The restrictor 56 has an engaging element 56A formed at an inward end thereof for engaging the teeth of the first gear 35, and a compression spring 57 mounted at an outward end thereof for biasing the restrictor 56 in an engaging direction. A flange-like element 58 is provided at the outward end of the restrictor 56 for applying an operating force thereto in a disengaging direction. A change shaft 59 is rotatably supported by the lid-like member 47, with a change arm 60 attached to an outer end of change shaft 59. The change shaft 59 has a pair of first contact arms 61 attached to a position thereof inside the lid-like member 47 to be pivotable with rotation of the change shaft 59 for contacting the flange-like element 58. A support shaft 62 extending parallel to the change shaft 59 has a pair of second contact arms 63 for contacting the flange-like element 58. The second contact arms 63 have a shaft 64 contactable by cams 61A formed on the first contact arms 61.

The change arm 60 is interlocked to the main shift lever 11 through a wire 65. When the main shift lever 11 is operated to a parking position P, the wire 65 connected thereto allows the restrictor 56 to project under the biasing force of compression spring 57 to engage the first gear 35. Conversely, when the main shift lever 11 is operated away from the parking position P, the wire 65 imparts a pulling force to disengage the restrictor 56 from the first gear 35 (the connection between wire 65 and main shift lever 11 not particularly described). In time of disengaging the restrictor 56, the change arm 60 is swung by the pulling force of wire 65. Simultaneously therewith, the change shaft 59 starts rotating, with distal ends of the first contact arms 61 spaced from the flange-like element 58. With this rotation, the shaft 64 of second contact arms 63 contacts the cams 61A of first contact arms 61. This causes distal ends of second contact arms 63 to contact the flange-like element 58. Thus, the restrictor 56 is moved in the disengaging direction by a strong force due to a large arm ratio. After the restrictor 56 is disengaged, the first contact arms 61 contact the flange-like element 58 to retract the restrictor 56 through a large stroke toward the lid member 47.

Figure 8:
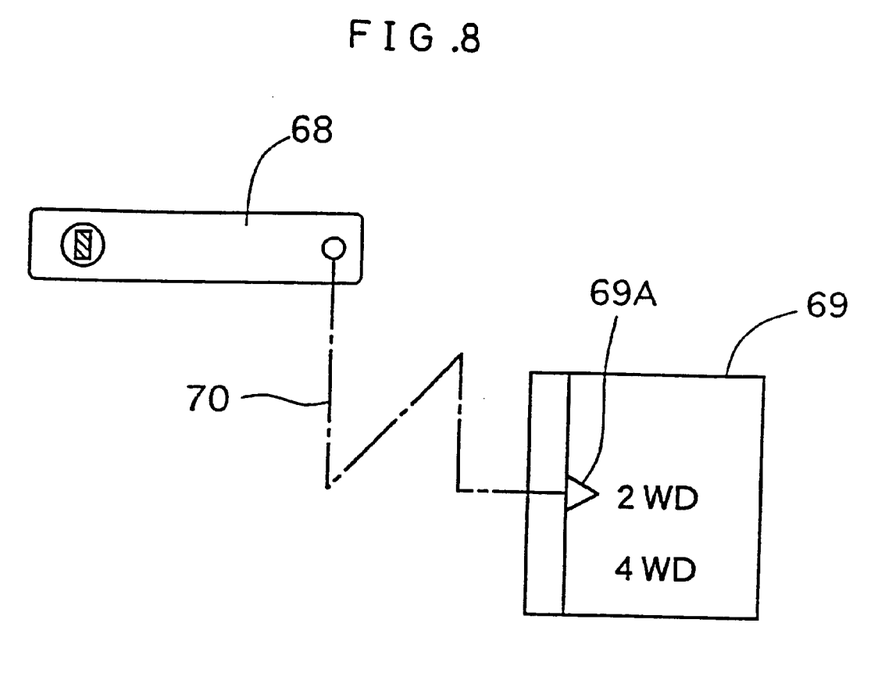
FIG. 8 is a schematic view of an indicator control system.

As shown in FIGS. 4 and 8, a support shaft 66 extending through and supported by the lid-like member 47 has a detecting arm 67 or first arm attached to an inward end thereof and engaged with the engaging pin 52 of the piston rod 50A. The support shaft 66 has an actuating arm 68, or second arm attached adjacent an outward end thereof and interlocked to an indicator 69 through a wire 70. The indicator 69 has a pointer 69A mechanically movable in response to the operative positions of the shifter 47. Thus, the driver can visually recognize three different states, i.e. the state of driving the front wheels 1 at equal speed (4WD), the state of accelerating the front wheels 1 (acceleration) and the state of transmitting no drive to the front wheels 1 (2WD). The support shaft 66 is supported as embraced by a boss 47B formed on the lid-like member 47. As shown in FIG. 4, the detecting arm 67 is disposed between an end of boss 47B and the piston rod 50A as seen in the fore and aft direction. The position of detecting arm 67 is stabilized through slidable contact with the boss 47B and piston rod 50A.

As shown in FIG. 4, a magnetic toothed wheel 71 formed of steel is mounted at a rear end of the front wheel drive shaft 32 to be rotatable therewith. A pickup type vehicle speed sensor 72 is inserted through a bore formed in a wall surface of the transmission case 5 adjacent a rear surface of this toothed wheel 71. Thus, a rotating speed of the front wheel drive shaft 32 is electrically measured. A control system is operable, when the front wheels 1 are in the state of acceleration, to perform an electrical process to reduce the vehicle speed measured by the sensor 72 to determine an accurate running speed. The vehicle speed sensor 72 transmits a signal through a cable (not shown) extending along an outer surface of the transmission case 5.

Figure 10:
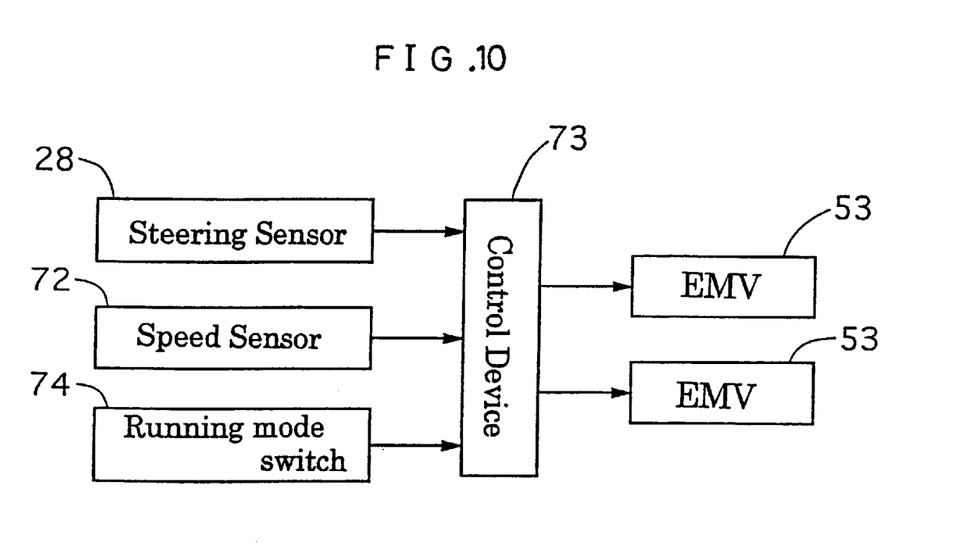
FIG. 10 is a block diagram of a control system.

As shown in FIG. 10, a controller 73 having a microprocessor receives signals from the steering sensor 28, vehicle speed sensor 72 and a running mode selecting switch 74, The controller 73 outputs signals to solenoids of the pair of electromagnetic valves 53.

When the running mode selecting switch 74 selects a mode for allowing acceleration of the front wheels 1, and the steering sensor 28 detects the front wheels 1 being steered in excess of a predetermined amount, the electromagnetic valves 53 are driven to accelerate the front wheels 1 only if the running speed of the vehicle body measured by the vehicle speed sensor 72 is below a predetermined speed. Particularly when the selector mechanisms 23 described hereinbefore select, based on the operation of pitman arm 19, the mode for operating the side brake 15 lying inwardly of the turn, the inward side brake 15 is operated in response to the steering operation to reduce the turning radius. The front wheels 1 are not accelerated in making a turn when the running mode selecting switch 74 is operated to select the mode for maintaining the two wheel drive state or the mode for maintaining the four wheel drive state.

In this tractor, as described above, switching may be made with the drive of the single hydraulic cylinder D, by setting the shift member to three positions, between the state of driving the front wheels 1 at substantially the same speed as the rear wheels 2, the state of driving the front wheels 1 substantially faster than the rear wheels 2, and the state of transmitting no drive to the front wheels 1. Thus, not only are a plurality of actuators unnecessary, but drive mode switching can be made reliably, and hardly any shock is produced in time of acceleration since the friction type accelerating clutch B is employed. When the equal speed drive is selected, the use of claw type equal speed clutch C maintains a strong tractive force without clutch slippage. Moreover, even when pressure oil is supplied under fixed pressure to the hydraulic cylinder D, the accelerating clutch B may be engaged slowly, and the equal speed clutch C engaged quickly. Thus, there is a still less chance of producing shock in time of acceleration. Switching is made to the equal speed drive without the inconvenience of having to accelerate the tractor after a slowdown.

What is claimed is:

1. A working vehicle comprising:
    an engine;
    rear wheels driven by said engine;
    front wheels; and
    a front wheel change speed device for transmitting drive from said engine to said front wheels selectively in at least two states including an equal speed drive state where a peripheral speed of said front wheels is substantially equal to a peripheral speed of said rear wheels, and an accelerating state where the peripheral speed of said front wheels is substantially higher than the peripheral speed of said rear wheels, said front wheel change speed device having:
        an equal speed clutch for transmitting drive to said front wheels in said equal speed drive state;
        an accelerating clutch disposed on a common axis with said equal speed clutch for transmitting drive to said front wheels in said accelerating state;
        a shift member shiftable along said axis to three positions for selectively operating said equal speed clutch and said accelerating clutch; and
        an actuator for shifting said shift member along said axis to said three positions;
    a front wheel drive shaft for transmitting the drive from said front wheel change speed device to said front wheels:
    a vehicle speed detection device for detecting a rotating speed of said front wheel drive shaft, said vehicle speed detection device having a rotary member mounted on said front wheel drive shaft to be rotatable in unison therewith, and a vehicle speed sensor for detecting the rotating speed of said rotary member; and
    a vehicle speed control device for activating said actuator based on said detected rotating speed to control the peripheral speed of said front wheels, said vehicle speed control device being operable to accelerate the peripheral speed of said front wheels only if said detected rotating speed is below a predetermined speed.

2. A working vehicle as defined in claim 1, wherein said three positions to which said shift member is shiftable are an equal speed position for engaging said equal speed clutch, an accelerating position for engaging said accelerating clutch, and a neutral position for disengaging both said equal speed clutch and said accelerating clutch.

3. A working vehicle as defined in claim 1, wherein said equal speed clutch is a claw type clutch, and said accelerating clutch is a friction type clutch.

4. A working vehicle as defined in claim 2, wherein said actuator comprises a hydraulic cylinder for setting said shift member to each of said equal speed position, said accelerating position and said neutral position.

5. A working vehicle as defined in claim 2, wherein said actuator is operable to shift said shift member at a faster speed from said neutral position to said equal speed position than from said neutral position to said accelerating position.

6. A working vehicle as defined in claim 4, wherein said hydraulic cylinder includes an actuating member for shifting said shift member in one direction when pressure oil is supplied to one pressure receiving surface, and in the other direction when the pressure oil is supplied to the other pressure receiving direction, said pressure receiving surfaces of said actuating member have different areas such that said actuating member is operated at a faster speed from said neutral position to said equal speed position than from said neutral position to said accelerating position.

7. A working vehicle as defined in claim 6, wherein said actuating member has an operating stroke such that, when said hydraulic cylinder operates said actuating member toward said accelerating position, said shift member is shifted to said accelerating position before said actuating member reaches an operative end thereof.

8. A working vehicle as defined in claim 1, wherein said actuator is disposed on one of right and left sides of a transmission case and adjacent an output shaft connecting said front wheel change speed device to said front wheels.

9. A working vehicle comprising:

an engine;

rear wheels driven by said engine;

front wheels;

a front wheel change speed device for transmitting drive from said engine to said front wheels selectively in at least two states including an equal speed drive state where a peripheral speed of said front wheels is substantially equal to a peripheral speed of said rear wheels, and an accelerating state where the peripheral speed of said front wheels is substantially higher than the peripheral speed of said rear wheels, said front wheel change speed device having:

an equal speed clutch for transmitting drive to said front wheels in said equal speed drive state;

an accelerating clutch disposed on a common axis with said equal speed clutch for transmitting drive to said front wheels in said accelerating state;

a shift member shiftable along said axis to three positions for selectively operating said equal speed clutch and said accelerating clutch; and an actuator for shifting said shift member along said axis to said three positions;

a support shaft extending substantially perpendicular to said axis;

a first arm mounted on one end of said support shaft adjacent to said actuator, wherein said actuator causes said first arm to be pivoted about said support shaft when said actuator shifts said shift member along said axis;

a second arm mounted on the other end of said support shaft remote from said actuator, wherein said second arm is pivoted about said support shaft when said first arm is pivoted about said support shaft; and an indicator mechanically interlocked to said second arm so as to visually indicate one of said three positions of said shift member based on an amount of pivot of said second arm.

10. A working vehicle comprising:

an engine;

rear wheels driven by said engine;

front wheels;

a front wheel change speed device for transmitting drive from said engine to said front wheels selectively in at least two states including an equal speed drive state where a peripheral speed of said front wheels is substantially equal to a peripheral speed of said rear wheels, and an accelerating state where the peripheral speed of said front wheels is substantially higher than the peripheral speed of said rear wheels, said front wheel change speed device having:

an equal speed clutch for transmitting drive to said front wheels in said equal speed drive state;

an accelerating clutch disposed on a common axis with said equal speed clutch for transmitting drive to said front wheels in said accelerating state;

a shift member shiftable along said axis to three positions for selectively operating said equal speed clutch and said accelerating clutch, said three positions being an equal speed position for engaging said equal speed clutch, an accelerating position for engaging said accelerating clutch, and a neutral position for disengaging both said equal speed clutch and said accelerating clutch;

an actuator for shifting said shift member along said axis to said three positions, wherein said actuator comprises a hydraulic cylinder for setting said shift member to each of said equal speed position, said accelerating position and said neutral position, and wherein said hydraulic cylinder includes an actuating member having at least a pair of pressure receiving surfaces for shifting said shift member in one direction when pressure oil is supplied to one of said pressure receiving surfaces, and in the other direction when the pressure oil is supplied to the other of said pressure receiving surfaces, said pair of pressure receiving surfaces having different areas such that said actuating member is operated at a faster speed from said neutral position to said equal speed position than from said neutral position to said accelerating position; and two control valves for controlling supply of the pressure oil to said hydraulic cylinder, one of said control valves being adapted to supply the pressure oil to said one of said pressure receiving surfaces, and the other of said control valves being adapted to supply the pressure oil to the other of said pressure receiving surfaces.

11. A working vehicle as defined in claim 10, wherein said two control valves are configured identical.

* * * * *